(12) United States Patent
Windsor (10) Patent No.: US 8,013,567 B2
(45) Date of Patent: Sep. 6, 2011

(54) PORTABLE POWER AND UTILITY SYSTEM

(76) Inventor: Michael E. Windsor, Weir, KS (US)

( * ) Notice: Subject to any disclaimer, the term of this patent is extended or adjusted under 35 U.S.C. 154(b) by 763 days.

(21) Appl. No.: 12/132,861

(22) Filed: Jun. 4, 2008

(65) Prior Publication Data
US 2008/0297103 A1 Dec. 4, 2008

Related U.S. Application Data

(60) Provisional application No. 60/941,866, filed on Jun. 4, 2007.

(51) Int. Cl.
*H02J 7/00* (2006.01)
*H02J 7/14* (2006.01)
(52) U.S. Cl. ............... 320/104; 320/101; 320/103
(58) Field of Classification Search .......... 320/101, 320/103, 104, 105, 107
See application file for complete search history.

(56) References Cited

U.S. PATENT DOCUMENTS
6,660,967 B2 12/2003 Brofft et al.
2002/0163196 A1* 11/2002 Brofft et al. ............ 290/1 A
* cited by examiner

*Primary Examiner* — Edward Tso
*Assistant Examiner* — Samuel Berhanu (57) ABSTRACT

A portable power and utility system for mounting in or on a host vehicle with an electrical system or, alternatively, operating in a standalone, portable configuration. The portable power and utility system includes an enclosure, an AC power subsystem mounted in the enclosure, a fluid power air subsystem mounted in the enclosure and an optional host vehicle connection adapted for selectively connecting the electrical system of the host vehicle and the AC power subsystem. A battery charger subsystem is connected to one or both of the host vehicle electrical system and the AC power subsystem. Wheels can be mounted on the enclosure for transportation. A control panel is mounted in the enclosure and includes multiple switches for controlling operation of the subsystems.

14 Claims, 9 Drawing Sheets

CONTROL PANEL FUNCTIONS

| SWITCH | FEATURE | FUNCTIONS | DESCRIPTION |
|---|---|---|---|
| 1 | AC POWER | ON/OFF | 110V AC SUPPLY TO BOX |
| 2 | AIR COMPRESSOR | ON/OFF | ONBOARD AIR COMPRESSOR |
| 3 | TRUCK BATTERY CONNECT | ON/OFF | CHARGE/JUMP START TRUCK OR CHARGE TOOL BOX |
| 4 | BATTERY CHARGER | TOOL BOX/TRUCK | CHARGE TOOL BOX OR TRUCK VIA CHARGER |
| 5 | AUXILIARY SWITCH | ON/OFF | ACCESSORY #1 |
| 6 | AUXILIARY SWITCH | ON/OFF | ACCESSORY #2 |

*FIG. 4*

SWITCH POSITION PER FUNCTION
(X = DOESN'T MATTER, P = PREFERRED OFF, BUT NOT CRITICAL)

| 1 | 2 | 3 | 4 | 5 | 6 | FUNCTION |
|---|---|---|---|---|---|---|
| ON | X | X | X | X | X | 110V AC POWER OUTLET |
| ON | ON | X | X | X | X | AIR COMPRESSOR |
| P | P | ON | X | X | X | CHARGE POWER BOX THROUGH VEHICLE'S CHARGING SYSTEM |
| P | P | ON | X | X | X | USE POWER BOX TO JUMP START VEHICLE |
| P | P | OFF | TOOLBOX | X | X | CHARGE POWER BOX USING INTERNAL CHARGER |
| P | P | ON | TRUCK | X | X | CHARGE VEHICLE USING INTERNAL CHARGER |
| X | X | X | X | ON | X | ACCESSORY #1 |
| X | X | X | X | X | ON | ACCESSORY #2 |

PORTABLE POWER AND UTILITY SYSTEM

CROSS REFERENCE TO RELATED APPLICATION

This application claims priority in provisional application No. 60/941,866, filed Jun. 4, 2007, which is incorporated herein by reference.

BACKGROUND OF THE INVENTION

1. Field of the Invention

The present invention relates generally to specialized power and utility equipment, and in particular to a compact, portable system for providing a broad range of power and utility functions in various environments, which can be remote from other sources of power such as alternating current (AC) electrical, direct current (DC) electrical, pneumatic, hydraulic, and other forms of power, for performing a broad range of tasks, including powering a variety of power tools, charging portable power tools and powering other equipment and other systems and assisting in various tasks.

2. Description of the Related Art

Various types of power and utility equipment and resources are used to operate power devices and to perform work operations. For example, electrical (AC and DC), hydraulic, gaseous, pneumatic and other types of tools are commonly used in performing a wide range of useful work operations. Facilities such as service centers, maintenance and repair shops and garages are therefore equipped with fluid (defined broadly to include both hydraulic and pneumatic and various gases) and electrical power (AC/DC) sources as needed for the tools appropriate for the types of work being performed.

However, many tasks must be performed "on site" or "in the field", thereby necessitating a portable power and utility system for task-performing tools and equipment. Construction and maintenance work is often performed in remote, outdoor locations using AC and DC electric, pneumatic, and gaseous powered power tools and other equipment. Portability is therefore an important design criterion for power and utility systems intended for "job site" and "in field" use. Portability is broadly construed to encompass transportability mounted in or on a vehicle, and also standalone capability for being carried or wheeled to job site locations away from vehicles and external power sources so that power can be provided for the task-performing tools and equipment.

Various power needs can be encountered, including electrical (AC/DC of various voltages and capacities) and fluid (broadly construed to encompass air/pneumatic, gaseous, and liquid/hydraulic). Portable power from this power and utility system is useful for many applications, including but not limited to, powering what would be considered a normal AC electric powered tool that is best suitable for the job to be performed, in a remote location with no main line utility supplied AC power available to the user. Portable power can be used for supplying DC power to DC powered tools and equipment, like winches, pumps, lights, and even emergency DC power for jumpstarting vehicles and equipment of all types, including land vehicles, aircraft, watercraft, heavy equipment, construction equipment and agricultural equipment and AC emergency power used for powering household items like refrigerators, lights, and televisions during main AC power outages experienced by a household. Various electrical power requirements can be encountered among different vehicles, such as the different voltages necessary for jumpstarting heavy equipment, aircraft, etc. Compactness is desirable for portability and mounting in or on vehicles, which broadly encompass trailers (utility, camping, boat, RV's etc.), truck beds, hand trucks, carts, etc. Another important design criterion is versatility whereby an operator can be provided with a range of power and utility capabilities for accomplishing various tasks with the appropriate tools. Adaptability, including scalability, facilitates sizing and configuring the system for a wide range of intended uses and levels of power as required by the user and service platforms ranging from fixed mountings onboard vehicles to system units capable of being carried by an individual or equipped with wheels in cart-like configurations for ease of transportation.

The present invention addresses these considerations. Heretofore there has not been available a diversified power and utility system adapted for transportation by vehicle or by hand, with the advantages and features of the present invention.

SUMMARY OF THE INVENTION

In the practice of an aspect of the present invention, a power and utility system is provided, which can optionally be installed in or on a vehicle for portability, rolled on its own wheels or carried by an individual or individuals. Without limitation on the generality of useful applications and resources of the present invention, they can include electrical power from both internal and external sources, pneumatic, gaseous, and/or hydraulic power from a self-contained compressor, pressure cells and/or hydraulic power from a self-contained pump. Power output can be provided via a wide range of suitable connections, including direct wiring to power lines, extension cords, extension hoses, etc., including through the cigarette lighter of a host vehicle. Utility extension cords, booster cables and pneumatic, hydraulic, and industrial hoses are also provided for power connections to tools and equipment as required. The system is capable of operating in a complete standalone mode, and although this is its normal operating mode, it can also pull power from external sources, such as an external source of AC electrical power. Still further, the system can interface with the electrical system of a vehicle or other DC power source system and draw power to operate the functions of the power and utility system while recharging the internal system battery or batteries. In the stand alone mode the unit can function is a backup power source for the vehicle or external system that requires power. With the units ability to provide power on its own, it can therefore conserve the vehicle system battery capacity reservoir therefore allowing it to be able to normally start the vehicle, and this is very helpful when the system is used at the scene of an accident, to operate emergency vehicle lighting for an extended period of time, usually resulting in the depletion of the vehicle system battery, sometimes to the point of its inability to restart the vehicle engine. The system can also supply AC electrical power for powering a metal cutting saw to help remove trapped individuals from wreckage, air power can be used for the same, or for powering pneumatic jacks to lift the wreckage off of an individual, or hydraulic power to operate power tools like Jaws of Life® equipment, where hydraulics are used to bend and form metal wreckage to assist in the egress of an individual. The power and utility system can even act as an Emergency AC power source for homes, whereby interconnecting the power and utility system to the home's refrigerator, television, the light(s) and even the phone system of the home, powering all of them at the same time, while the home's main AC power source has been interrupted due to weather conditions such as hurricanes, floods, tornados or other interrupting factors.

While providing power to the user, if the power and utility system battery should become depleted, the vehicle can simply be started and idled whereby the power and utility system automatically connects to the vehicle power system. In this configuration the power and utility system will draw power from the vehicle's power system and can continue to provide AC power to the home or other power load. When the power and utility system battery is recharged the vehicle motor can be turned off. The power and utility system does not need to be fully recharged to supply power, as long as the vehicle motor has operated long enough to build up a reserve capacity inside the power and utility system battery. The power and utility system itself is considered environmentally "green," quiet, and safe, since the vehicle motor has a catalytic converter and must meet emissions standards. National parks and other overnight parking areas no longer allow generators and/or may have "no idle" rules for parked vehicles. The power and utility system can quietly supply hours of AC and/or DC power to the user as required, with no noise or fuel exhaust emission of any kind, thus, improving the environment and complying with the noise regulations of the areas. The pneumatic air pumps and hydraulic pumps make a low level noise while running, but as they are contained and built-in inside the enclosure, their noise level is minimal and non-invasive. The system can include an internal battery charger adapted for charging its own battery or various other external batteries and those of a host vehicle. Alternatively, the system can be configured for operating completely independently of a host vehicle or any other device or facility for hours at a time (depending on power draw requirements and capacity of the system).

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the vehicle on which the system is mounted, if appropriate. Said terminology will include the words specifically mentioned, derivatives thereof and words of similar meaning.

Figure 1:
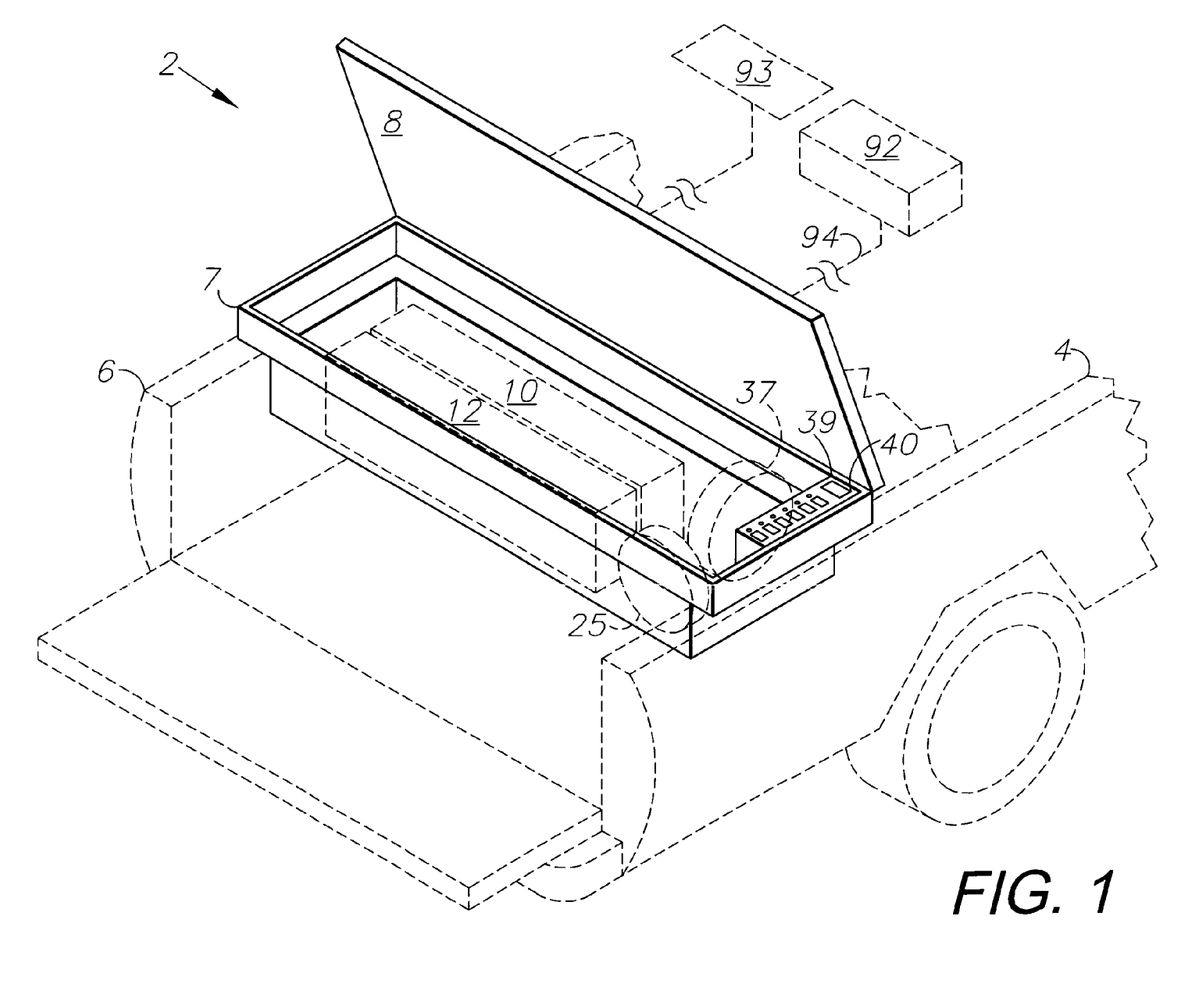
FIG. 1 is a perspective view of a portable power and utility system embodying a first aspect of the present invention, shown mounted in the bed of a pickup truck (commonly located immediately behind the cab) and showing the general locations of major components and subsystems.
Figure 2:
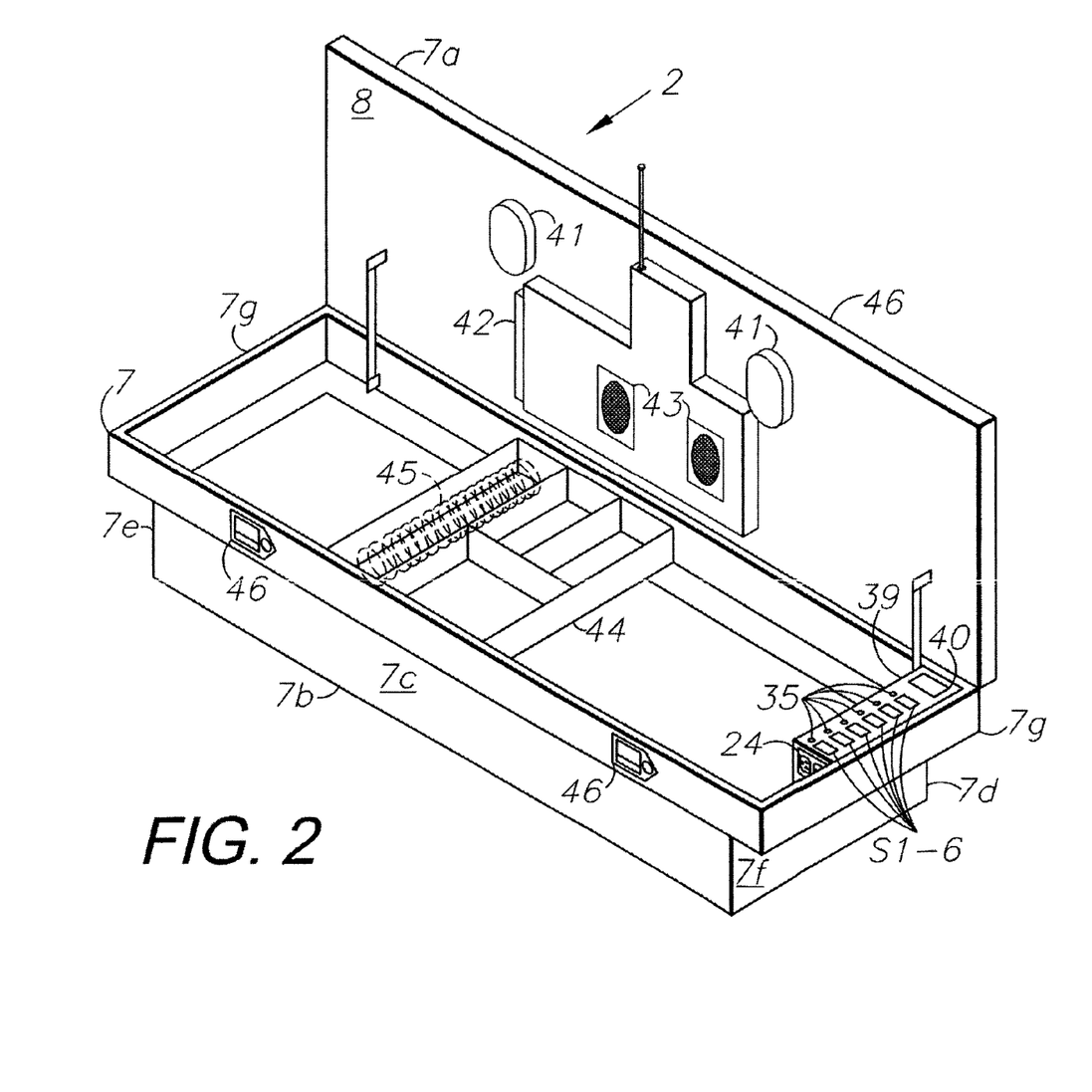
FIG. 2 is an enlarged, perspective view of the system.

Referring to the drawings in more detail, the reference numeral 2 generally designates a power and utility system embodying an aspect of the present invention. Without limitation on the useful applications of the system 2, an exemplary aspect is disclosed in or on a host vehicle, e.g. a pickup truck 4. The system 2 can be mounted, for example, in a toolbox-type enclosure 7 with a top or first face 7*a* selectively closed by a lid 8, a bottom or second face 7*b*, front and back (third and fourth) faces 7*c,d* and opposite side (fifth and sixth) faces 7*e,f*. The enclosure 7 can comprise the type adapted for placement across a bed 6 of the pickup truck 4 with a pair of side extensions 7*g* adapted for resting on top of sidewalls 6*a* of the bed 6. The system 2 is shown near the back of the pickup truck bed 6 for convenient access over the tailgate, but is normally located forward against the back of the cab, or at other locations in the bed 6. A wide variety of alternative installations are within the scope of the present invention, including alternative orientations, enclosures and vehicles. As will be described in more detail below, an aspect of the present invention can be utilized standalone, i.e. remote from a vehicle.

The first aspect of the system 2 includes five major subsystems, each corresponding to a respective function: electrical power (alternating current (AC) and direct current (DC)) 10; fluid power (pneumatic compressor and/or hydraulic pump) 12; vehicle battery connect 14; battery charger 16; and entertainment system 42.

II. Electrical Power Subsystem 10

Figure 3:
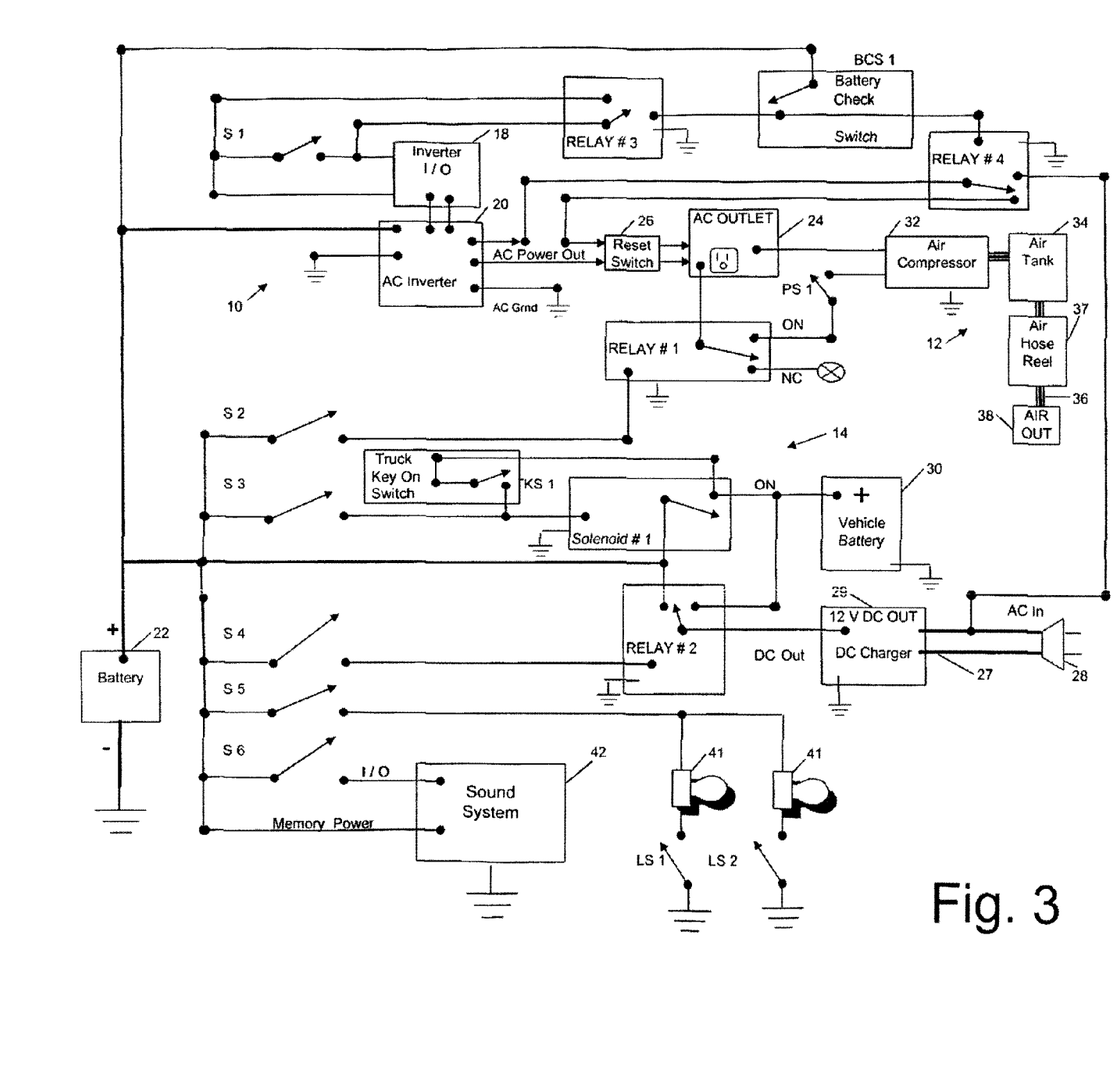
FIG. 3 is a circuit diagram of the system.

As shown in the circuit diagram FIG. 3, closing switch S1 activates the AC power function by energizing an inverter I/O 18 whereby an AC inverter 20 receives DC current from a system battery 22 and outputs AC current to an AC outlet 24. DC power is input to the inverter 20, which outputs AC power at the AC outlet 24. A built-in but removable and retractable extension cord 25 provides a convenient connection to the AC power subsystem 10. Short-circuit protection is provided by a resettable trip switch 26.

Relay #4 is normally closed to connect the AC inverter 20 to the AC outlet 24, but can be switched to receive input from an AC in line 27 and a plug 28 whereby a battery check switch BCS #1 energizes the I/O inverter 20 via relay #3 for checking the system battery 22. A DC charger 29 is connected to the AC in line 27 and selectively connects to the system battery 22 and a vehicle battery 30 via relay #2. An audio alert 31 produces an audible signal when the short-circuit switch 26 is tripped or the system battery 22 is depleted.

By way of example and without limitation, the electrical power components can comprise conventional electrical storage batteries, fuel cells, ultra-high capacity capacitors or any other component or technology for storing electrical power. Moreover, the system 2 is configured to provide a boost jumpstart utilizing the subsystem battery 22, the vehicle battery 30 and potentially other energy sources. Heavy equipment and vehicles, including aircraft, can be jumpstarted with the system 2 by combining the batteries 22, 30.

III. Fluid Power Subsystem 12

Fluid power broadly encompasses pneumatic (air compressor), gaseous power (propane, pressure vessels and pumps), and hydraulic (fluid) power (liquid pump) components of all types. The gaseous power can be in the form of pressurized supplied power or utility power used with other systems, or fuel gasses, such as propane and acetylene, which can be dispensed from a tank for various uses, such as powering welding and other equipment. Interconnections among the tanks can be provided to, for example, blend fuel gasses with air or oxygen for welding, cutting and other applications. The fluid power subsystem 12 can include all power parameters including pneumatic, gaseous, and hydraulic components for providing these types of power. Thus, the following description, which relates primarily to a pneumatic subsystem, also applies to a hydraulic subsystem with appropriate component substitutions or additions, e.g. the installation of both air and hydraulic systems in the same enclosure, or all fluid power systems in the same enclosure or a hydraulic pump instead of an air compressor, a hydraulic reservoir instead of an air reservoir, or other configuration to accommodate the needs of the user. The magnitude of performance of these systems can be altered by installing higher performing components, which may require more space, thereby requiring the removal of some of the other systems to meet the needs of the customer or by using a larger enclosure to accommodate those performance requirements while still providing the standard offering of power and utility services described herein.

An air compressor(s) 32 is activated by switch S2 via relay #1 and pressurizes an air tank 34, which is connected to an air hose 36 retractably wound on an air hose reel 37 and terminating at an air outlet 38 comprising an air chuck, a quick-connect or another suitable pneumatic connector. An air pressure switch PSI is provided for automatically maintaining the air pressure in the air tank 34 within a predetermined operating pressure range. Other pneumatic components such as pressure relief valves, portable air tanks and other reservoirs, inline oilers, pressure flow regulators, extension hoses and pressure gauges and other accessories can also be included in the fluid power subsystem 12. The hydraulic system and/or gaseous system would be configured in the same manner with the same or separate electrical switch, and function with similar type hoses, lines, regulators, pressure valves, electronic valves and connectors appropriate for the material/fluid power being transferred.

IV. Vehicle Battery Connection Subsystem 14

The vehicle battery connection subsystem 14 enables charging the system battery 22 from the vehicle electrical system and when necessary, selectively switched by S3 for connecting to and jumpstarting the vehicle 4 with the system battery 22. The system battery 22 may contain more than one battery at the same or different voltage levels and this battery can also boost or augment the vehicle battery 30 for procedures requiring extra battery power, such as starting heavy equipment or other vehicles. The system battery connection subsystem can be configured to place the vehicle battery 30 and system battery 22 in a series circuit path to output a higher voltage for powering or for use in starting power for systems requiring 24 volt, 28 volt, and even higher voltage required systems.

V. Battery Charger Subsystem 16

An internal and/or built-in and/or removable DC charger 29 is adapted for charging virtually any battery including but not limited to the system battery 22 and/or the vehicle battery 30, system battery 22 from an external AC power via an AC in line 27. When selectively switched by S4, the DC charger 29 can monitor, test, and charge the vehicle battery 30 separately and independently from the power and utility system battery 22. An auxiliary switch and simple relay can be added to the circuitry and mounted in control panel 39 to enable DC charger 29 to charge any battery of a 6 volt or 12 volt (higher voltage chargers can be substituted into the system) configuration, utilizing a separate connector and cabling to allow for hookup to a completely separate battery for charging. By selectively switching S3, both the power and utility system battery 22 and the vehicle battery 30 can be charged at the same time. A control panel 39 is mounted in the enclosure 7 and can selectively control the functions of the battery charger. The first generation product includes a battery status indicator display 40 with a conventional charging amp meter and LEDs for indicating fully charged and discharged battery conditions, and to indicate that a battery replacement is required. The battery charger subsystem 16 can operate in a rapid charge or trickle charge mode. External batteries can be charged by connecting them to the charger 29 in parallel with the system batteries 22, and/or system battery 30.

The battery charger subsystem 16 can comprise a "smart" battery charger, which can be located on the opposite side of enclosure 7 from control panel 39, and can operate in multiple modes of power output and nominal charge rates of 2, 10, and 25 amps for various types of batteries and has a full and complete lighted display to indicate to the user operating status and to convey battery check, test, and charge information.

A switch is incorporated with the charger near its display to enable battery checking of the system battery 22 and by selectively controlling control panel 39, the charger can either charge both the system battery 22 and vehicle battery 30 at the same time, or control panel 39 selectively can configure relay #2 to charge vehicle battery 30 only, or parallel charge external batteries as previously stated. When the DC charger 29 switch is in the on position, S1 is bypassed and activated to "on" to power the inverter 20 and subsequently powers the DC charger 29 system. To monitor and charge the battery system selectively chosen through the control panel 39, with the DC charger 29 switch on, relay #4 is activated and the AC power to AC Outlet 24 is interrupted and there is no AC Power output available. This is a safety design in the system for this testing and charging configuration.

The DC charger 29 can include a display 40, which can be located in the enclosure 7 and can be configured to indicate a state of charge and/or charge level of the system battery 22, the vehicle battery 30, external batteries and/or indicate the charging/discharging condition thereof and any battery replacement needs.

VI. Controls and Ancillary Functions

Figure 4:
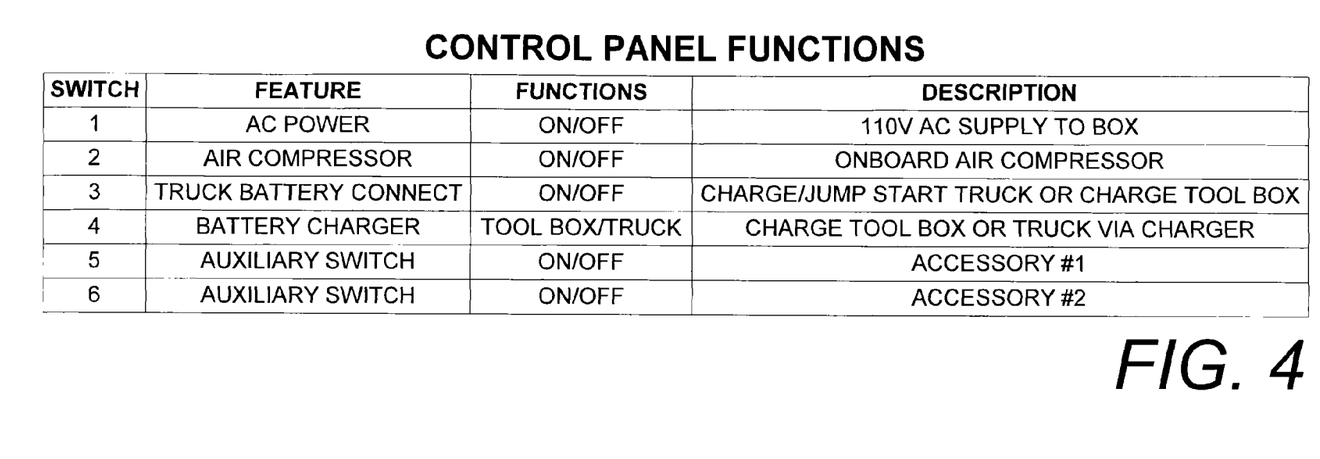
FIG. 4 is a table showing the functions of a control panel of the system.
Figure 5:
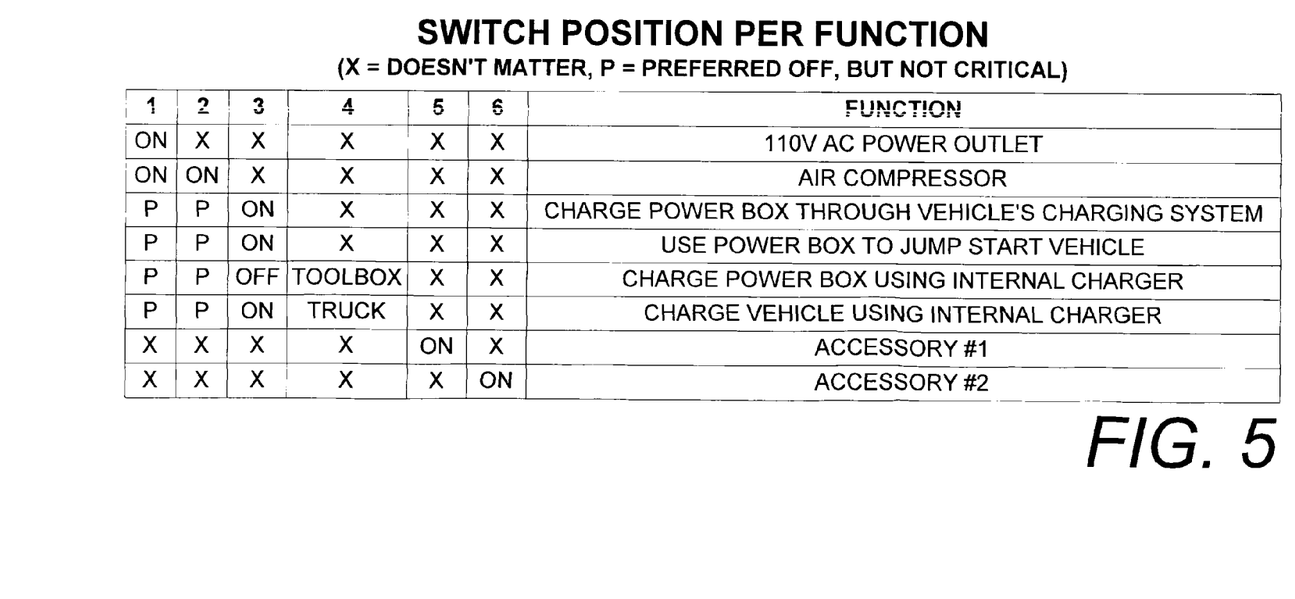
FIG. 5 is a table showing the switch positions for various functions of the system.

A suitable control panel 39 is mounted in the enclosure 7 and selectively controls the majority of the functions of the power and utility system. The control panel 39 also includes the switches described above in connection with the various functions of the system 2. Control panel 39 can be optionally configured to provide additional control features to a separate remote control panel (not shown), which may be a hard-wired or wireless configuration, and can be mounted in a more suitable location relative to the user, i.e. inside the cab of the vehicle, at a work location at the rear of the vehicle or carried with the user for control from a greater distance, e.g., if the user is on the roof of a structure he or she can turn on the air compressor remotely to provide air power to an air-powered nail gun on the roof connected through the hose connections of the power and utility system allowing the user to use the power and utility system more conveniently.

A pair of lights 41 are mounted on the inside face of the lid 8 of the enclosure 7. Other lights can be configured to allow maximum coverage of the area inside the enclosure 7 as well as the area around and outside of the enclosure 7, such as the bed of a pickup truck, the bed of a trailer if mounted on a trailer, and other similar circumstances as required by the customer. Power output from the power and utility system can be configured to provide power to emergency type lighting of the type used by emergency, public safety vehicles, maintenance, utility and other vehicles so as not to run down the vehicle battery 30, and instead use the power from the system battery 22, either through DC and/or AC output to provide the long term light necessary for the particular circumstance required while maintaining adequate vehicle battery power to start the vehicle when necessary.

Optional circuitry can be added to the system to allow for the automatic starting and running of the vehicle when the power and utility system battery drops to a predetermined level. This can also be offered to the user in an optional remote control starting mechanism. The host vehicle can be remotely started by remote command by the user or made to automatically start and run, automatically connecting to the power and utility system and continue to run the lights or provide the necessary power to the end user, while also charging up the system battery 22 as the motor runs. Timing for running the motor can be predetermined and set by the user, as well as cycle times for automatic start and stop of the motor for the recharging of the system. This is a helpful feature for operators (e.g., firemen, law enforcement officers, etc.) who must leave their vehicle lights on for extended periods and either leave their motors running or periodically restart them to recharge. This feature of the power and utility system 2 can save fuel and reduce handful exhaust emissions.

An optional entertainment system 42 can be mounted on the inside face of the lid 8 or inside the body of enclosure 7. Without limitation on the generality of useful functions and features of the entertainment system 42, it can include: maritime warning broadcasts, computer monitors and/or displays, digital video disc (DVD) players, high-definition television (HDTV), television tuners, speakers 43. The entertainment system 42 can include a power antenna 96, which can automatically raise and lower when the lid 8 is opened and closed respectively or controlled by auxiliary switch on control panel 39. The entertainment subsystem 42 can include single or multiple control function displays, wired or wireless, a monitor display system such as a liquid crystal display (LCD) panel, HDTV, or DVD type monitor display, the entertainment subsystem 42 may also include other type of electronic devices such as a DVD player, a television tuner, satellite dish hook up parameters, a compact disc (CD) player, an AM/FM stereo player, a National Oceanic & Atmospheric Administration (NOAA) Weather band monitoring system, a public address system, a scanner and/or a short wave and/or business band radio communications, digital video recorder (DVR) system, with observation cameras, and/or hookups for cameras, a vehicle tracking system, a global navigation satellite system (GNSS) monitoring system, cellular communication system, satellite transponder and various other configurations. A tool tray 44 is placed in the enclosure 7 and is adapted to receive various tools, parts, materials and other objects. The accessory tool tray 44 can be slid from side to side in the enclosure 7.

The system 2 can include various optional components accommodating various functions, such as lights 41 mounted in the enclosure lid 8 or sides of the enclosure 7, or built in to the other various enclosures shown in FIGS. 6, 7, 8, 9 and 10 and an entertainment system 42 as previously described. For example, a photovoltaic solar panel 93 can be mounted on the enclosure 7 (e.g., on the underside of its lid 8), on the vehicle 4 or elsewhere and can be electrically coupled with the electrical power subsystem 10 as a supplemental electrical power source. The lid 8 can be secured in its closed position by suitable latches 46 for securing the contents of the enclosure 7. A remote control module 92 is provided for placement in the cab of the vehicle 4, and can include all of the functionalities of the control panel 39. The remote control module 92 can be connected to the other components of the system 2 by a hardwired or wireless connection, which is depicted at 94. Alternatively, the remote control module 92 can be portable and located exteriorly of the vehicle for remote activation by a user using a hand-held unit or other suitable control. Moreover, the control panel functions and switch positions per function, as shown in FIGS. 4 and 5 respectively, can be reconfigured, reassigned and expanded to accommodate a wide range of functions and system components. Extra or accessory switches can be provided whereby users can add additional functionalities.

Figure 6:
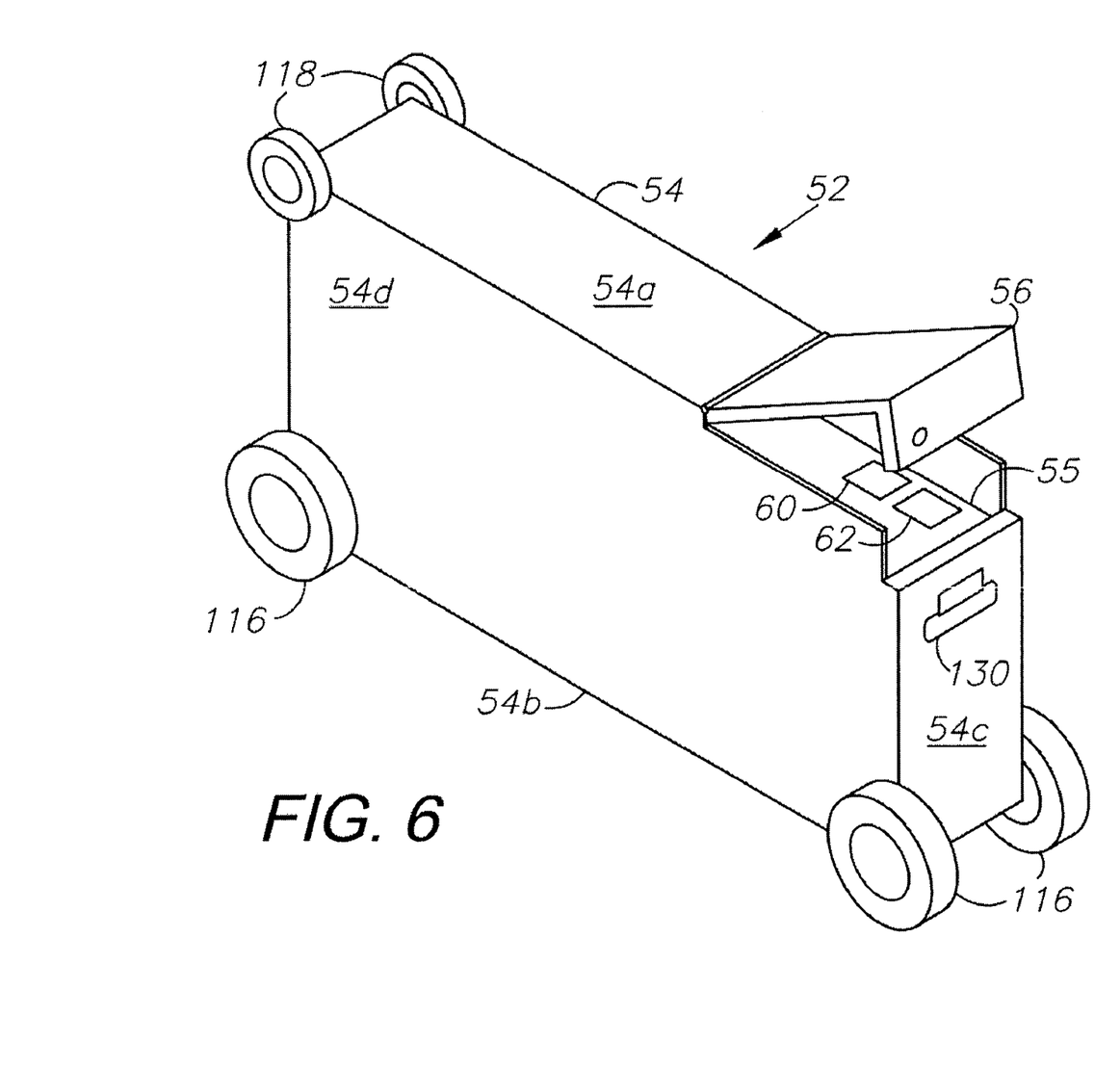
FIG. 6 is a perspective view of a second aspect portable power and utility system.
Figure 7:
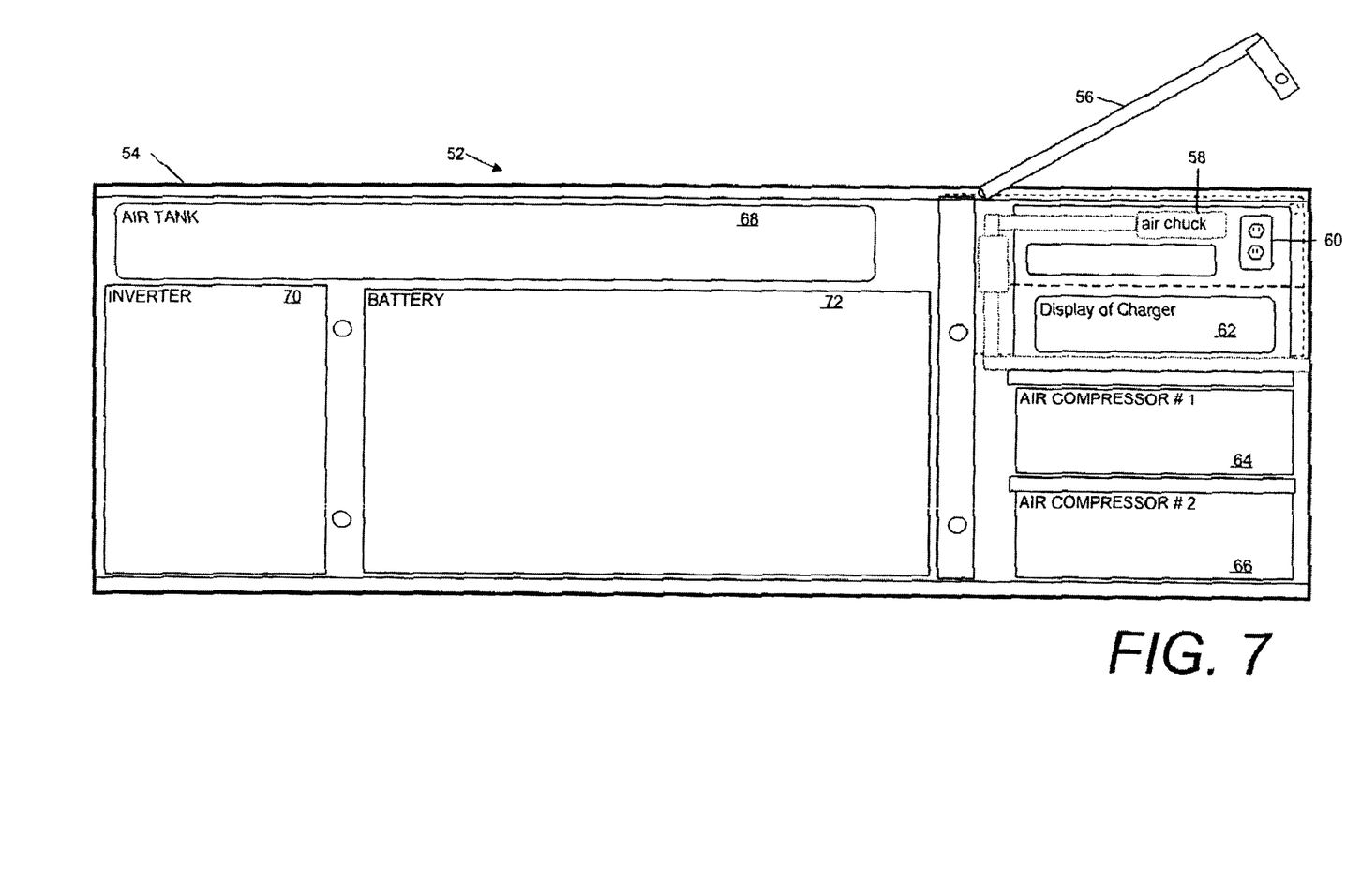
FIG. 7 is a side, cross sectional view of one example of an internal configuration of the power and utility systems.

A portable power and utility system 52 comprising a second aspect of the present invention with similar functions and control features is shown in FIGS. 6 and 7. An enclosure 54 includes: first and second opposite faces 54a,b; third and fourth opposite faces 54c,d; and fifth and sixth opposite faces 54e,f. A lid 56 is provided in the enclosure face 54a (positioned on top as shown in FIG. 6) and provides access to a compressed air fitting 58, such as a quick-connect air chuck, which in turn receives pressurized air from an air tank 68 supplied by first and second air compressors 64, 66. The air compressors 64, 66 can be activated manually or automatically in order to maintain a predetermined operating pressure in the air tank 68. Operation of the air compressors 64, 66 is normally operated in the dual mode where both units are supplying power and they can be sequenced so that only one is running if the demand for compressed air is at a lower rate. Both compressors can be automatically activated to meet the compressed air demand on the system 52. One or both of the air compressors can be replaced with a hydraulic fluid pumping system that can provide hydraulic power to the end user through hydraulic interconnecting hoses and connector fittings. Other energy and power systems can be utilized in place of the air compressors 64, 66. Operation of these pumps can be handled in the same manner as previously described. The onboard air reservoir tank(s) can be replaced with a hydraulic fluid reservoir, or both air and fluid reservoirs can be sized in a manner for both of them to be contained inside the enclosures shown or a larger enclosure can be designed and constructed to house the necessary power system requirements. An AC outlet 16 and a charger display 62 are also accessible through the enclosure lid 56, and are electrically connected to an inverter 70 and a system battery 72.

By way of example and without limitation, the system 52 is adapted for operation from the bed of a pickup truck, service style truck with narrow rear bed, trailers, RVs, and in various mobile environments. It can be manually carried and has handles (e.g., 130) for carrying to a job sight. Axle holes can be provided for attaching optional wheels for ease of mobility, or the system 52 can be mounted in or on a vehicle, trailer, or other transportation device. For example, the enclosure faces 54c,d can be located in generally vertical planes whereby the system 52 can be compactly stored against the back of a truck cab or against the sidewall of a truck bed. There are several different mounting configurations that may be encountered, such as the mounting on a trailer tongue or bed, or in a recreation vehicle (RV), or the chassis frame of a flat bed pickup, along the side underneath, inside a van, or camper or even a sport utility vehicle (SUV).

The second aspect power and utility system 52 can incorporate one or more hydraulic power subsystems in place of the pneumatic components, as previously described, with similar hookups for vehicle battery system 30, and controls for jump starting the vehicle and charging various batteries as previously described.

Figure 8:
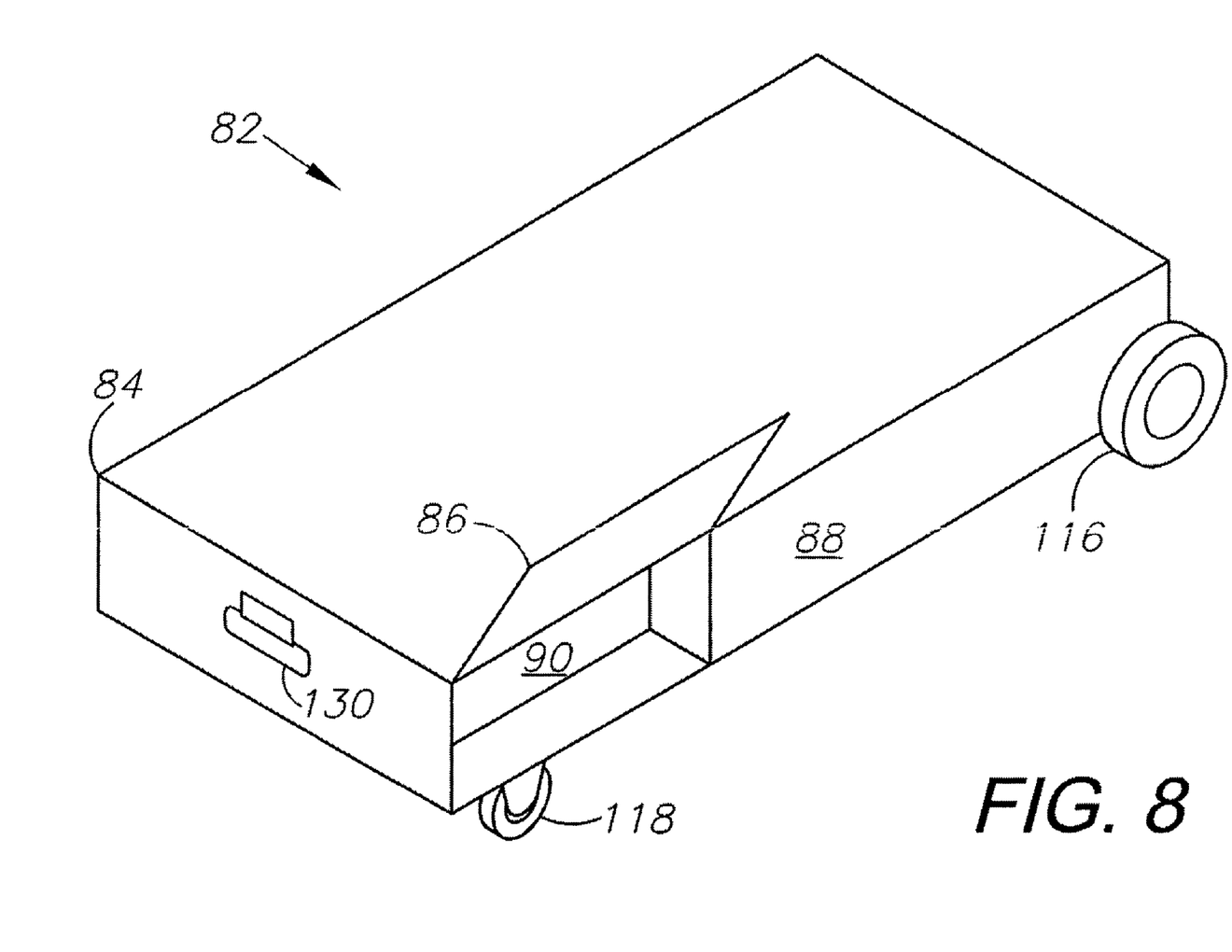
FIG. 8 is a perspective view of a third aspect portable power and utility system, shown in a horizontal position for mounting in a flat configuration.

A power and utility system 82 comprising a third aspect of the present invention is shown in FIG. 8 and is functionally generally similar to the system 52 with a modified enclosure 84 including a lid 86, which is horizontally hinged along a respective face 88a and adapted for opening generally outwardly and upwardly in order to provide access to the AC, control panel and compressed air outlets of the system 82, which are located within a compartment 90 selectively covered by the lid 88.

Figure 9:
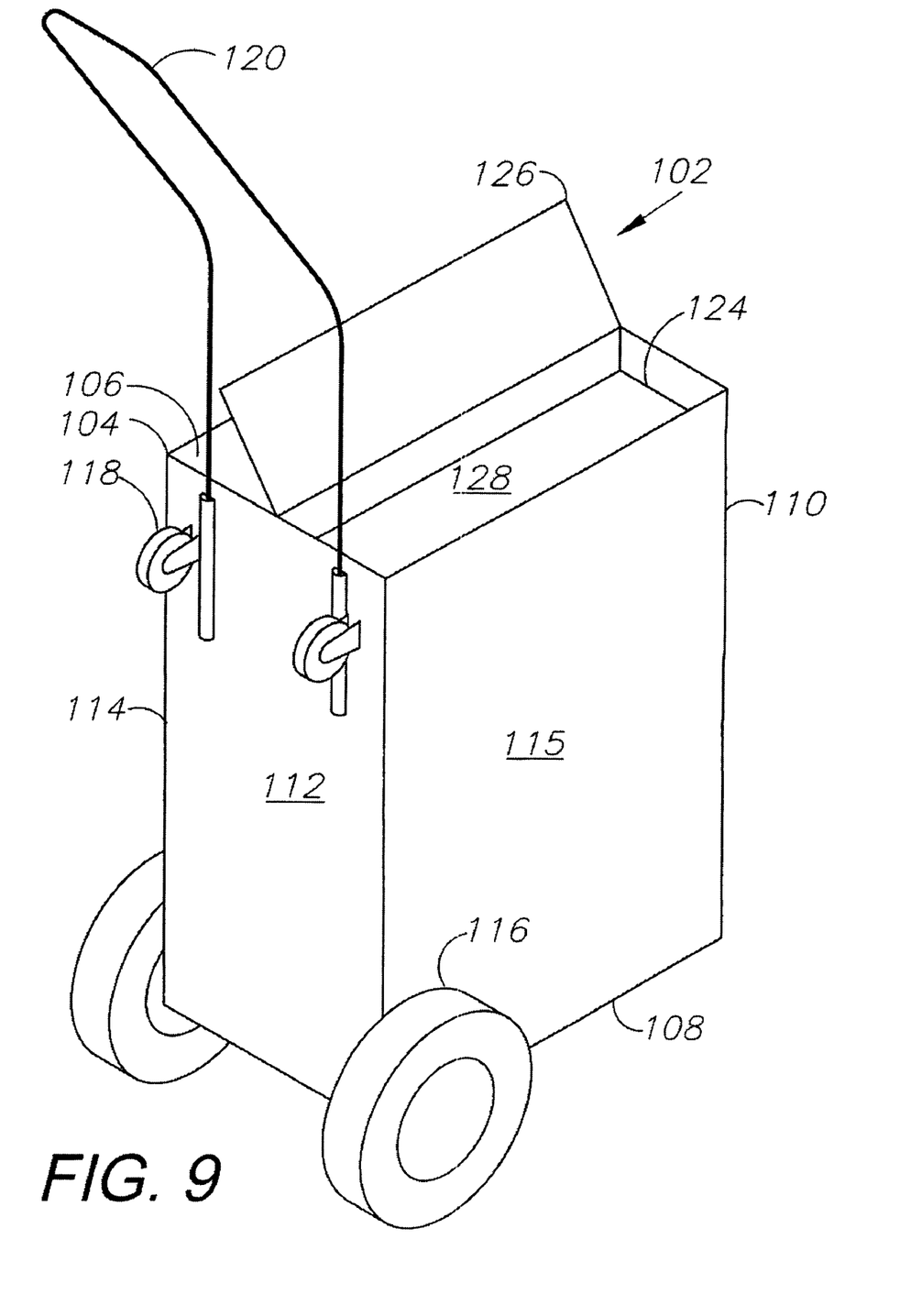
FIG. 9 is a perspective view of a fourth aspect portable power and utility system, including removable wheels and shown in a vertical orientation.
Figure 10:
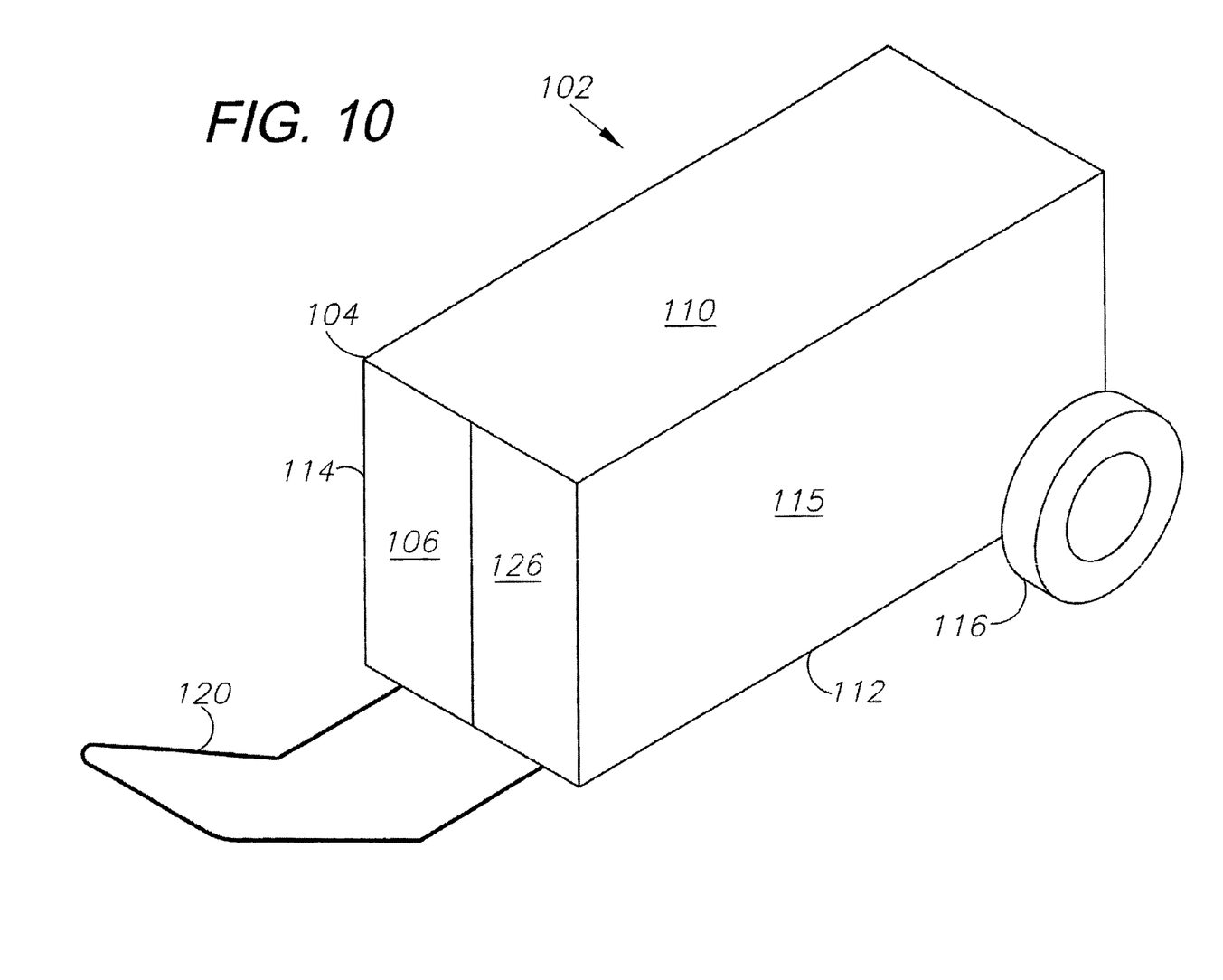
FIG. 10 is a perspective view thereof, shown in a horizontal orientation.

FIGS. 9 and 10 show a cart configuration power and utility system 102 comprising a fourth aspect of the invention, with an enclosure 104 having first and second faces 106a,b; third and fourth faces 106c,d; and fifth and sixth (side) faces 106e,f. A pair of main wheels 116 is mounted adjacent to the side faces 106e, 106f in proximity to an intersection of the enclosure faces 106b, 106d. A pair of auxiliary wheels 118 is mounted on the enclosure face 106d and also 108. A removable handle 120 is also mounted on the enclosure face 106d and extends from the enclosure face 106a for conveniently grasping by an operator whereby the system 102 can easily be wheeled to a desired work location, thus providing a relatively high degree of mobility.

FIG. 9 depicts the hand truck configuration and FIG. 10 depicts the wagon configuration. The cart configuration system 102 can include any or all of the functionalities discussed above, and others within the broad range of functionalities of the systems embodying the present invention. For example, the system 102 can be configured with an AC power subsystem 122 only. In this configuration all of the battery charging, jumpstarting and electrical service functionalities of the systems 2, 52, 82 described above can be provided. The system 102 can also be configured with air power or fluid power as previously described and has a built-in but removable charger accessed through a hinged opening in sides 110 and 115. In addition to the generally horizontal orientation shown in FIG. 9, the system 102 can be oriented generally vertically (FIG. 10) whereby the system 102 is supported on its main wheels 116 and its enclosure bottom 108, which may also have auxiliary wheels.

The enclosure 104 includes a compartment 124, which is accessible via a hinged lid 126 for access to a control panel 128, which controls the AC power functionality of the system 102, including outlets for AC power, connections for attaching jumper cables to DC power and other electrical power functionalities. Both FIG. 9 and FIG. 10 configurations contain a automobile cigarette lighter style 12 volt DC output connector, controllable by an on/off switch located adjacent to the connector. A male plug to male plug cable can be attached to the power system 102 and when the auxiliary switch is turned on, and the other end of the cable is plugged into the cigarette lighter of the car/vehicle/SUV, the vehicle can charge the power and utility system 102 while vehicle motor is running and cigarette lighter power plug is activated. Although the power and utility system 102 is configured with a high amperage battery jumper cable connector and connectable jumper cables, for emergency jump starting vehicles, it can also charge the vehicle system battery 30 when connected through the cigarette lighter power outlet of the vehicle when the vehicle is not running or when it has a low battery, which connection can be considered a low-power, low-amperage connection suitable for charging the battery relatively slowly. For emergency starting requirements, it is recommended that the high amperage battery jumper cables are used properly with the power and utilities system 102.

It is to be understood that the invention can be embodied in various forms, and is not limited to the examples discussed above. Other components and configurations can be utilized in the practice of the present invention.

Having thus described the invention, what is claimed as new and desired to be secured by Letters Patent is:

1. A portable power and utility system for interfacing with a vehicle electrical system including a vehicle battery, or alternatively in a complete stand alone configuration which the portable power and utility system comprises of the following:

an enclosure;

said enclosure including a subenclosure formed therein and a lid movable between an open position providing access to said subenclosure and a closed position enclosing said enclosure;

an AC/DC power subsystem in said enclosure and including a subsystem battery, an inverter connected to the subsystem battery and an AC power outlet located internally or externally, connected to the inverter to provide alternating current power to an internal or external load; and a vehicle battery connection subsystem in said enclosure and selectively or automatically connecting the vehicle electrical system to said AC/DC power subsystem, whereby said subsystem battery supplements said vehicle battery;

said vehicle battery connection subsystem being connected for charging said subsystem battery with said vehicle electrical system; and said subsystem battery being used for powering said vehicle electrical system and jumpstarting a host vehicle battery; and a boost jumpstart subsystem that can be activated internally or externally or both to supply a host vehicle electrical system or an external separate vehicle electrical system or both; and a DC power subsystem for supplying DC power internally or externally for direct current loads and accessible by user; and a compressed air subsystem comprising an air compressor and an air tank(s) located within said enclosure, said air compressor being operably connected to said air tank(s) for charging the air tank(s); and said compressed air subsystem including a hose connection for discharging compressed air from said air tank(s) and supplying a load; and an air hose subsystem comprising of;

an air hose connector(s) for external connection by user to a tool or a reserve tank or other compressed air subsystem or any combination thereof; and a hydraulic power subsystem comprising a hydraulic pump and hydraulic tank located within said enclosure, said hydraulic pump being operably connected to said hydraulic tank and connected via hydraulic hoses and hydraulic connector subsystem for supplying hydraulic power to an internal or external load through connectors accessible by user; and a gaseous power subsystem comprising of various gaseous fuels located within enclosure, said gaseous power subsystem being operably connected via gaseous hoses, gaseous hose connectors and control valve systems for supplying gaseous power to an internal or external load or tool or appliance through connections accessible by user; and said gaseous power subsystem connected to gaseous tanks internal within enclosure or to external gaseous tanks, or to both; and said gaseous hose connectors for external connection by user; and a battery charger subsystem in said enclosure and including an intelligent or simple battery charger connecting to one or both of an internal or an external AC power source and connected to said AC/DC power subsystem; and said battery charger subsystem selectively or automatically connects to one or more of the following; the vehicle battery; the subsystem battery; an external battery or battery subsystem or any combination thereof; for the purposes of charging, checking, testing or conditioning the connected battery or battery subsystem or both; and a self recharging system which incorporates power derived from solar panel, wind generator and other motion power generating devices; and a control panel, connected by wire or wireless or both, located internally or external or both of said subenclosure or said enclosure or both and including controls, to said AC/DC power subsystem; and said control panel including switches or control mechanisms or both for controlling one or more functions from among the group comprising:

said AC power; said DC Power; said solar power; said wind power; said air compressor; said fluid power; said host vehicle battery connect; said external battery connect; said battery charger charge/check/test/condition portable power subsystem, said host vehicle battery, said external battery; lights; entertainment; and other auxiliary device(s).

2. The power and utility system according to claim 1, which includes:
a photovoltaic panel electrically coupled with at least one of said vehicle battery or said subsystem battery or both, said photovoltaic panel and connected for supplementing and charging said subsystem battery or vehicle battery or both.

3. The power and utility system according to claim 1, which includes:
an electrical power source for connection to said vehicle battery or said subsystem battery or to both and comprising at least one or more of the following that is mounted to the said enclosure or vehicle; a photovoltaic panel; a wind generator; a motion-activated generator; a fuel-cell; an ultra-high capacity capacitor.

4. The power and utility system according to claim 1, wherein said AC/DC power subsystem being connected to an AC outlet; and an extension cord for connection to said AC outlet; and an extension cord reel located in said enclosure and connected for receiving said extension cord, said extension cord being movable between a wound retracted position on said extension cord reel and an unwound extended position from said extension cord reel.

5. The power and utility system according to claim 1, which includes said enclosure having opposite side faces and a pair of extensions each located at and extending from a respective side face; and said enclosure being adapted for mounting at least partially in a pickup truck bed with said extensions each located on top of a respective side of said bed; and a compartment.

6. The power and utility system according to claim 1, which includes:
a battery status display connected to at least one of said host vehicle or said AC/DC power subsystem or external batteries or any combination thereof and properly connected for indicating a charge status and other relative information of the connected battery.

7. The power and utility system according to claim 1, which includes: wheels mounted on said enclosure.

8. The power and utility system according to claim 7, which includes:
said wheels comprising a pair of main wheels; an auxiliary pair of wheels mounted on said enclosure in spaced relation from said main wheels; and a handle(s) mounted on and extending from said enclosure.

9. The power and utility system according to claim 1, which includes; said enclosure having a lid with an inside face; and an auxiliary subsystem mounted on the inside face of said lid and including an AC or DC light fixture; and an entertainment system mounted inside the said enclosure.

10. The power and utility system according to claim 1, which includes: said air compressor subsystem including; a pressure gauge, a relief valve designed to open if a predetermined pressure in said air tank is exceeded, hoses, connectors, and a pressure flow regulator.

11. The power and utility system according to claim 1, wherein said hydraulic power subsystem includes; a hydraulic hose subsystem being connected for movement between a wound retracted position on said hydraulic hose reel and an unwound extended position extending from the said hydraulic hose reel.

12. The power and utility system according to claim 1, wherein said gaseous power subsystem includes; a gaseous hose subsystem to connect to gaseous hose reel connection and a gaseous hose reel connection for receiving said gaseous hose; and being connected for movement between a wound retracted position on said gaseous hose reel and an unwound extended position extending from the said gaseous hose reel.

13. A power and utility system that is portable for interfacing with a vehicle electrical system including a vehicle battery, or alternatively in complete stand alone configuration which the portable power and utility system comprises of the following:
an enclosure;
said enclosure including a subenclosure formed therein and a lid movable between an open position providing access to said subenclosure and a closed position enclosing said enclosure;
an AC/DC power subsystem in said enclosure and including a subsystem battery, an inverter connected to the subsystem battery and an AC power outlet located internally or externally, connected to the inverter to provide alternating current power to an internal or external load; and
said AC outlet being located inside or outside or both of said subenclosure and located internally or externally or both on the said enclosure; and
a vehicle battery connection subsystem in said enclosure and selectively or automatically connecting the vehicle electrical system to the said AC/DC power subsystem, whereby said subsystem battery supplements said vehicle battery;
said vehicle battery connection subsystem being connected for charging said subsystem battery with said vehicle electrical system; and said subsystem battery being connected for powering said vehicle electrical system and jumpstarting said host vehicle battery; and a boost jumpstart subsystem that can be activated internally or externally or both to supply said host vehicle electrical system or an external separate vehicle electrical system or both; and a DC power subsystem for supplying DC power internally or externally for direct current loads and accessible by user; and said subsystem battery directly connecting through boost jumpstart cable;

a battery charger subsystem in said enclosure and including an intelligent or simple battery charger connecting to one or both of an internal or an external AC power source and connected to said AC/DC, power subsystem; and said battery charger subsystem selectively or automatically connects to one or more of the following; the vehicle battery; the subsystem battery; an external battery or battery subsystem or any combination thereof, for the purposes of charging, checking, testing or conditioning the specific connected battery or battery subsystem or both; and a self recharging system which incorporates power derived from solar panel, wind generator and other motion power generating devices;

main wheels mounted on said enclosure; and auxiliary wheels mounted on said enclosure in spaced relation from said main wheels;

a handle(s) mounted on said enclosure and movable between first and second opposite handle positions, said handle including a proximal section extending alongside and attached to a respective enclosure lace and a distal section forming an angle with respect to said proximal section;

said enclosure being configured for a first vertical orientation supported primarily on its main wheels and a second horizontal orientation supported primarily on said main and auxiliary wheels;

said handle distal section extending in a first direction behind said enclosure with said handle in its first position and said enclosure in its vertical orientation; and said handle distal section extending in a second, upward direction with said handle in its second position and said enclosure in its horizontal orientation;

a compressed air subsystem comprising an air compressor and an air tank located within said enclosure, said air compressor being operably connected to said air tank for charging the air tank(s); and said compressed air subsystem including a hose connection for discharging compressed air from said air tank(s), an air hose for connection to said hose connection and an air hose reel connected for receiving said air hose; and said air hose being connected for movement between a wound retracted position on said hose reel and an unwound extended position extending from said hose reel;

said compressed air subsystem connectors for external connection by user; and an air hose subsystem comprising of;

an air hose with connectors for external connection by user to a tool or a reserve tank or other compressed air subsystem or any combination thereof; and said air compressor subsystem including; a pressure gauge, a relief valve designed to open if a predetermined pressure in said air tank is exceeded, hoses, connectors, and a pressure flow regulator;

a hydraulic power subsystem comprising a hydraulic pump and hydraulic tank located within said enclosure, said hydraulic pump being operably connected to said hydraulic tank and connected via hydraulic hoses and hydraulic connector subsystem for supplying hydraulic power to an internal or external load through connectors accessible by user; and a hydraulic hose subsystem being connected for movement between a wound retracted position on said hydraulic hose reel and an unwound extended position extending from the said hydraulic hose reel; and said hydraulic hose subsystem connectors for external connection by user; and a gaseous power subsystem comprising of various gaseous fuels located within enclosure, said gaseous power subsystem being operably connected via gaseous hoses, gaseous hose connectors and control valve systems for supplying gaseous power to an internal or external load or tool or appliance through connections accessible by user; and said gaseous power subsystem connected to gaseous tanks internal within enclosure or to external gaseous tanks, or to both; and said gaseous hose connectors for external connection by user; and said gaseous power subsystem includes;

a gaseous hose subsystem to connect to gaseous hose reel connection and a gaseous hose reel connection for receiving said gaseous hose; and being connected for movement between a wound retracted position on said gaseous hose reel and an unwound extended position extending from the said gaseous hose reel; and an auxiliary subsystem mounted on the inside face of said lid and including a light fixture(s) and an entertainment system; and a control panel, connected by wire or wireless or both, located internally or external or both of said subenclosure or said enclosure or both and including controls, to said AC/DC power subsystem; and said control panel including switches or control mechanisms or both for controlling one or more functions from among the group comprising: said AC power; said DC Power; said solar power; said wind power; said air compressor; said fluid power; said host vehicle battery connect; said external battery connect; said battery charger charge/check/test/condition portable power subsystem, said host vehicle battery; said external battery; lights; entertainment; and other auxiliary device(s).

14. A portable power and utility system for interfacing with a vehicle including an electrical system having a battery, which power and utility system comprises:

an enclosure;

said enclosure including a subenclosure formed therein and a lid movable between an open position providing access to said subenclosure and a closed position enclosing the said subenclosure;

said subenclosure providing built-in storage;

an AC/DC power subsystem in said enclosure and including a subsystem battery, an inverter connected to the subsystem battery and an AC power outlet located internally or externally, connected to the inverter to provide alternating current power to an internal or external load; and a vehicle battery connection subsystem in said enclosure and selectively or automatically or both connecting the vehicle electrical system to the said AC/DC power subsystem;

a battery charger subsystem in said enclosure and including an intelligent or simple battery charger connecting to one or both of an internal or an external AC power source and connected to said AC/DC power subsystem; and said battery charger subsystem selectively or automatically connects to one or more of the following; the vehicle battery; the subsystem battery; an external battery or battery subsystem or any combination thereof, for the purposes of charging, checking, testing or conditioning the specific connected battery or battery subsystem or both; and said subsystem battery being connected for powering said vehicle electrical system and jumpstarting a host vehicle battery; and a boost jumpstart subsystem that can be activated internally or externally or both to supply a host vehicle electrical system or an external separate vehicle electrical system or both; and a DC power subsystem for supplying DC power internally or externally for direct current loads and accessible by user; and said subsystem battery directly connecting through boost jumpstart cabling to separate external vehicle for the purposes of supplying DC power to the separate external vehicle and jumpstarting external vehicle; and said subsystem battery directly connecting to separate external vehicle with power and utility system said AC/DC power subsystem connected to host vehicle electric subsystem so that both power and utility system and said host vehicle electrical system is connected and providing increased current or voltage or both for additional power to jumpstart through booster cabling separate external vehicle; and said subsystem battery being connected for supplementing said vehicle battery;

said vehicle battery connection subsystem being connected for charging said subsystem battery with said vehicle electrical system;

a self recharging system which incorporates power derived from solar panel, wind generator and other motion power generating devices;

a compressed air subsystem in said enclosure and including an air compressor and an air tank located within said enclosure, said air compressor being operably connected to said air tank and connected for charging said air tank;

said compressed air subsystem including a hose connection for discharging compressed air from said air tank, to a pressure gauge, a relief valve designed to open if predetermined pressure in said air tank is exceeded and a pressure flow regulator;

an air hose reel for receiving said air hose with said air hose being made for movement between a wound retracted position on said hose reel and an unwound extended position extending from said hose reel; and said compress air subsystem connectors for external connection by user; and an electrical extension cord for connection to said AC outlet;

an extension cord reel located in said enclosure and made for receiving said extension cord;

said extension cord being movable between a wound retracted position wound on said extension cord reel and an unwound extended position unwound from said cord reel;

said subsystem battery being connected for supplementing said vehicle electrical system and jumpstarting said vehicle;

said vehicle electrical system being connected for charging said subsystem battery;

said enclosure including top, bottom, front and back faces;

said enclosure having opposite side faces and a pair of extensions each located at and extending from a respective side face;

said enclosure being designed for mounting at least partially in a pickup truck bed with said extensions each located on top of a respective side of said bed;

an auxiliary subsystem mounted on the inside face of said lid and including a light fixture(s) and an entertainment system; and a compartmentalized tray movably positioned in said subenclosure and accessible through the open lid thereof; and a control panel, connected by wire or wireless or both, located internally or external or both of said subenclosure or said enclosure or both and including controls, to said AC/DC power subsystem; and said control panel including switches or control mechanisms or both for controlling one or more functions from among the group comprising: said AC power; said DC Power; said solar power; said wind power; said air compressor; said fluid power; said host vehicle battery connect; said external battery connect; said battery charger charge/check/test/condition portable power subsystem; said host vehicle battery; said external battery; lights; entertainment; and other auxiliary device(s).

* * * * *